Patented Nov. 19, 1935

2,021,862

UNITED STATES PATENT OFFICE 2,021,862

MANUFACTURE OF ARTIFICIAL MATERIALS

Leon Lilienfeld, Vienna, Austria

No Drawing. Application March 13, 1930, Serial No. 435,649. In Austria March 16, 1929

44 Claims. (Cl. 18—54)

The want of a process for the manufacture of artificial materials, particularly artificial threads, having a high degree of tenacity both in the dry and wet state and also (without being subjected to an after-treatment) a sufficiently high degree of extensibility (elongation just below the breaking point), constitutes a gap in the art. In the industries concerned, more particularly in the artificial silk industry, the problem of filling this gap is regarded as one of vital importance.

It is the object of this invention to remedy this deficiency.

The discovery is based on my observation that it is possible to produce artificial materials, particularly artificial threads, having a high degree of tenacity in the dry or wet state and also a high degree of extensibility, by contacting cellulose xanthate with a halogen derivative of a divalent or polyvalent alcohol or with a halogen derivative of an anhydride of a divalent or polyvalent alcohol (di-hydroxylic or polyhydroxylic alcohol), (such as epihalohydrine), thereafter giving the solution thus obtained the form of an artificial material, for instance of a thread and bringing the so shaped solution into contact with one or several agents which have a coagulating effect upon the solution and a plasticizing effect upon the freshly coagulated artificial material or bringing the so-shaped solution first into contact with an agent or agents which have a coagulating effect on the shaped material and then into contact with an agent or agents which have a plasticizing effect on the freshly coagulated material.

My invention includes the manufacture of artificial materials wherein substances which are capable of providing one or more unsubstituted or substituted alkyl, oxyalkyl or hydroxyalkyl radicals (for example substances capable of providing halogenated or non-halogenated polyhydroxylic alcohol radicals) are incorporated with a cellulose derivative containing one or more CSS-groups, whereupon the product thus obtained is brought into the shape of an artificial material and is acted upon with one or more agents, for instance strong mineral acid, which have a coagulating effect on the shaped material and a plasticizing effect on the freshly coagulated material, or is brought into the shape of an artificial material and acted upon first with one or more agents which have a coagulating effect on the shaped material and then with one or more agents which have a plasticizing effect on the freshly coagulated material.

The term "polyhydroxylic alcohol" is, wherever the contest permits, intended to embrace those which contain two OH groups as well as those which contain more than two OH groups (e. g. glycols, glycerine, etc.).

It will of course be understood that I do not restrict the term "alkyl radicals" to monovalent alkyl radicals.

My researches have not enabled me to state the chemistry of the process with absolute certainty. There are indications that the artificial materials produced consist of, or contain cellulose compounds, in which groups or radicals imparting elasticity are combined with the cellulose molecule. So far as the evidence goes the products may be regarded as cellulose compounds in which one or more hydroxyl hydrogen atoms of the cellulose molecule are exchanged for residues of polyhydroxylic alcohols, which may or may not contain one or more free hydroxyl groups, or mixtures of cellulose or cellulose hydrate with such cellulose compounds, which residues, according to my present knowledge, are responsible for the extensibility and/or elasticity of the final product. It is not impossible that, in some cases, the said cellulose compounds contain also one or more CSS-groups, in respect of the cellulose, with the said alcohol residues attached to them. It is, however, not desired to limit this invention to any set chemical formulae or definitions, since, while the products are possibly compounds or derivatives of the types mentioned, the final composition of the products is not definitely known with absolute certainty.

In my British Patent No. 26,928 of 1910, I proposed to add halogen derivatives of di- or polyvalent alcohols to viscose, in order to produce therein mercaptans or sulphides of said alcohols by interaction of the halogen derivatives with the by-products of the xanthate reaction containing sulphur (such as alkali sulphides or alkali polysulphides or alkali trithiocarbonate) and/or with the CSS-group of the viscose itself, in such manner that the CSS-group contained in the cellulose xanthate is split off and free cellulose or cellulose hydrate is formed.

My recent researches indicate that the course of the reaction which occurs in contacting viscose with halogen derivatives of polyhydroxylic alcohols does not follow the course suggested in that patent. However this may be, that patent does not teach the present invention, since the latter depends upon the effect of subjecting the product of contacting viscose with halogen derivatives of polyhydroxylic alcohols to the action of one or more agents which have a plasticizing effect on the material during or after its coagulation.

In like manner, my invention could not have been learned from another suggestion which has been made for using halogen derivatives of polyhydroxylic alcohols as etherifying agents for cellulose, said to be applicable to viscose, amongst other materials as parent material, the products being alleged to be capable of use for the various applications for which cellulose ethers or esters are capable or suitable.

In my present invention there appears to be a co-operation between the treatment of viscose with one or several halogen derivatives of polyhydroxylic alcohols (which probably has for a result the incorporation by introduction into or attachment to the cellulose molecule of one or several groups or radicals which impart elasticity) and the plasticizing effect of the setting bath or spinning bath. This cooperation seems to produce a new effect, such as none of the processes hitherto known has attained or has even nearly attained. For, by this invention it is possible to produce artificial materials, in which are united three properties such as have not appeared simultaneously in any artificial material hitherto known; namely (1) sufficiently high lustre, (2) very high tenacity in the dry and wet state, and notwithstanding that, (3) a degree of extensibility sufficient for all practical purposes.

As an illustrating example I will describe the making of artificial silk according to the present invention.

According to the present invention it is possible to produce lustrous artificial silk which has a dry tenacity of far more than 2 grams per denier and in many cases more than 4 or even 5 grams per denier, and having a wet tenacity of 1 to 2 grams per denier (and in some cases even 3 to 5 grams per denier) and nevertheless having an extensibility of some 7 to 10 per cent, and in some cases even up to 15 per cent. and more.

Artificial silk of a high degree of tenacity, so-called "Lilienfeld-Silk" (i. e. that made according to U. S. Patents Nos. 1,683,199 and 1,683,200 of September 4, 1928) the extensibility of which is improved by subsequent treatment with shrinking agents, is of quite a different order (see my U. S. applications Ser. Nos. 308,589, 186,575, 367,154 and 367,150; U. S. Patents 1,989,098 to 1,989,101 inclusive and No. 2,001,621). For, apart from the fact that a subsequent additional treatment of artificial silk in hanks, in quantities in which they are manufactured at the present time even in factories of medium size, is a complicated process requiring considerable working space, time, and labor, the subsequent shrinkage causes in every case a small loss of lustre, a considerable loss of the original length, an increase in the titre and, in most cases, a decrease in the tenacity. In contrast with this, the present process (without being more complicated or difficult in its chemical or mechanical operation than the usual viscose processes) produces, already during the spinning process, lustrous threads of a very high degree of tenacity, which without any special subsequent treatment may have an extensibility of, for example, 10 or 15 per cent.

In addition to this there is the important feature inherent in the artificial materials (e. g. artificial silk) made by the present process, that (so far as can be judged at present) the elasticity, and especially the elasticity after bending, is considerably higher than that of any artificial threads of high tenacity hitherto known.

In connection with artificial threads, particularly artificial silk, the invention offers the further advantage that in the spinning process the single filaments (probably on account of their high degree of elasticity) show even then little or no tendency to break when the thread is subjected to additional stretching in the course of spinning. The result of this is that the artificial threads produced according to this process in many cases show only slight tendency or no tendency to form fluff, at any rate, less tendency to form fluff than artificial silk produced under same spinning conditions from the original viscose.

To carry out this process, viscose is brought together with one or several halogen derivatives of polyhydroxylic alcohols, or of anhydrides of such alcohols, particularly with one or several halohydrines, whereupon the solution of the product obtained in this manner is given the form of an artificial material, for example artificial thread and contacted with one or several agents which have a coagulating effect on the shaped solution and a plasticizing effect on the freshly coagulated artificial material.

The isolation of the intermediate product is not necessary. In other words: It suffices to mix viscose with the corresponding quantity of the desired halogen derivative of a polyhydroxylic alcohol, and finally to work up the solution into an artificial material by bringing it together with one or several agents which have a coagulating effect on the solution and a plasticizing effect upon the freshly coagulated artificial material, for example artificial thread. If required, the reaction of the viscose with the halogen derivative may be accelerated by gentle heating, for instance to a temperature of 50° to 70° C.

Instead of viscose, one of the other cellulose compounds containing the CSS-group, for instance a cellulose-xantho-fatty acid or cellulose dixanthate may be used as the initial material. It seems to be essential that the product which is to be converted into the artificial material should contain a CSS-group or groups and at least one radical of a polyhydroxylic alcohol (which may or may not contain one or more free hydroxyl groups).

So far as the second phase of the process, namely the production of artificial material, is concerned, for instance the production of artificial threads, films, bands and the like, the most advantageous procedure is to pass or press the solution through suitably shaped openings into a bath which has a coagulating effect on the solution and a plasticizing effect on the freshly coagulated artificial material, whereupon the coagulated product, after leaving the setting bath and, if desired, after having travelled for a certain distance in the air, is conducted to a collecting device, for instance a bobbin or a centrifuge.

As particularly suitable setting baths which have a plasticizing effect on the freshly coagulated artificial material, for example thread, may be cited: Baths consisting of or containing not less than about 35 to 40, preferably not less than 45 per cent. of $H_2SO_4$ or an equivalent quantity of another mineral acid. Other agents exerting a similar effect, for instance a solution of a zinc halide alone or mixed with an acid or with another salt or both, may, however, be used.

If strong sulphuric acid be used as plasticizing agent, it may be used alone or (so far as is in conformity with the conditions of operation) mixed with one or several inorganic substances, for instance with one or several other strong mineral acids, such as hydrochloric acid, nitric acid, or phoshoric acid, or with a neutral or acid salt, such as sodium sulphate or sodium bisulphate, ammonium sulphate, magnesium sulphate, zinc sulphate, sodium bisulphite, sodium sulphite, sodium nitrite or boric acid. To these or a mixture of these with another strong acid or with one or several of the above named inorganic substances, may be added (so far as is in conformity with the conditions under which the strong sulphuric acid is used) a suitable quantity of one or several organic substances, such as glycerine, or a sugar, such as glucose, or an alcohol, or a salt of an organic base, for instance an aniline salt, or an organic acid, such as acetic acid, or formic acid, or lactic acid, or oxalic acid. If there is added a salt capable of reacting with the strong sulphuric acid with formation of an acid sulphate, or otherwise reacting with sulphuric acid, the strength of the sulphuric acid should be so chosen that, after the consumption of the amount of acid necessary for the formation of the acid sulphate or for the other reaction, the setting bath contains free sulphuric acid of the desired strength, but in no case less than about 35 parts by weight of sulphuric acid monohydrate in 100 parts by weight of the setting bath.

The part of this process concerned with the manufacture of artificial material may also be so conducted that first of all the solution is caused to enter through suitably formed openings, into a bath which has a coagulating effect on the solution but little or no plasticizing effect on the freshly coagulated artificial material, and then the artificial material, preliminarily coagulated, treated with a liquid which exerts a plasticizing effect, for instance with a setting bath having a high content of strong mineral acid, particularly having a content of at least 35 per cent. of sulphuric acid monohydrate. This method of conducting the process therefore requires two baths in sequence. The second bath serves to plasticize, the first bath may be such that the parent solution coagulates in water-soluble or water-insoluble form, for instance a solution of ammonium sulphate or sodium bisulphate or dilute sulphuric acid, or a liquid containing ammonium sulphate and sulphuric acid or one of the various baths known in the artificial silk art such as the Müller-bath or the like. (The Müller-bath, as is known, may be prepared, for example, according to U. S. Patent No. 836,452, or according to the German Patent No. 287,955.) After having been passed for a certain distance through such a bath, the thread is introduced into a second bath composed of one or several strong mineral acids or containing one or several strong mineral acids, for instance not less than 35 per cent. of $H_2SO_4$, or an equivalent amount of another strong acid or acids.

The action of the plasticizing agent in or outside of the setting bath must not be continued so long as to cause serious damage to, or even destruction of the coagulated artificial material. It is therefore important to interrupt the action of the strong acid on the artificial material, for example thread of the plasticizing agent in general and that of the strong acid in particular, by starting the washing process in good time or by using other means, for instance by exposing the threads to a low temperature. The checking of the action of the plasticizing agent in general and that of the strong acid in particular, is preferably arranged before or when the artificial material or threads arrive at the collecting device (spools, reels, centrifuges or the like). Only when the artificial materials, particularly threads, are collected in very thin layers, can the interruption of the action of the plasticizing agent, and particularly of the strong mineral acid be postponed for a short time. For practical reasons, however, it is not advantageous to collect in thin layers.

The dry and wet tenacity of the artificial material, particularly threads, produced according to this invention, is increased by giving the artificial material, particularly threads, an additional stretching, at least during a part of its course between the outlet (or spinning nozzle) and the collecting device, that is by subjecting it to a stretching greater than is necessary for the formation of the artificial material or thread. This stretching may be effected by any of the known methods, namely either in the setting bath or between the setting bath and the collecting device, or in both places. For instance, the distance between the collecting device and the bath may be made considerable, or the artificial material or thread may be conducted over rods, hooks, rollers or differential rollers, which are arranged in the setting bath or between the setting bath and the collecting device or in the setting bath and in the collecting device. The stretching may also be produced by using a very high speed of drawing or spinning, for instance 100 to 120 meters per minute. A high speed of drawing or spinning is generally to be recommended where in the course of the manufacture of the artificial material or the spinning of the artificial thread, no special measures are applied for stretching the artificial material or the thread.

The other conditions of working during the second phase of the process—that is the manufacture of the artificial material—which must be observed, such as the temperature of the setting bath, the length of immersion of the artificial material, for example thread, in the setting bath, the speed of drawing or spinning, the length of passage of the artificial material or thread through the air between the setting bath and the collecting device, and the degree of additional stretching—may be modified within wide limits.

After having been washed, the artificial material, particularly threads, may be steamed or heated before or after the drying process, which, in many cases, produces a further increase in tenacity.

If desired, the extensibility of the artificial material, particularly threads, produced according to the present process may be still more increased by treating them with shrinking agents, for example according to the processes described in my U. S. applications Ser. Nos. 308,589, 186,575, 367,154 and 367,150.

It is impossible to indicate every condition for success in every particular case and it is to be understood that preliminary experiment cannot be avoided to find what are the conditions necessary for success when using a particular cellulose, a particular halohydrine, a particular viscose and particular details of the spinning operation.

The following examples will further serve as practical illustrations of the invention, which however, is in no way limited to the examples; the parts are by weight:

I (a) to (i)

(a) 100 parts of wood-pulp (water content 8 per cent.) or cotton linters (water content 6 to 7 per cent) are introduced into 2000 parts of caustic soda solution of 18 per cent. strength at a temperature of 15° C. and left therein for 3 hours. The alkali cellulose is then pressed until it weighs in the case of wood-pulp 300 parts and in the case of linters 340 parts; it is shredded at a temperature of 11 to 15° C. for 2½ to 3 hours, whereupon in the case of wood-pulp 40 parts and in the case of linters 60 parts of carbon bisulphide are added, and the carbon bisulphide is allowed to act for about 8 hours at a temperature of 18 to 20° C. Any excess of carbon bisulphide is then blown off during 10 to 15 minutes, and the xanthate so produced is dissolved by the use of a quantity of caustic soda and water sufficient to cause the solution to contain about 6.5 per cent. of cellulose (analytically determined and 5 per cent. of NaOH.

When the dissolution is complete, 20 parts of α-dichlorohydrine [1:3 - dichloropropanol - (2)] are added to the viscose, and well stirred in, and the solution is then filtered three times through cotton, two filtrations being carried out soon after its preparation, while the third immediately precedes the spinning process. Before this spinning solution is spun it is left to age for 96 to 100 hours at a temperature of 15° C. The spinning is as follows:—

The spinning solution is pressed at a speed of 3.3 c. c. per minute through a platinum nozzle having 54 perforations of 0.1 mm. diameter, into a bath containing 65 per cent. of $H_2SO_4$ and having a temperature of 16° C., the length of immersion of the thread in the sulphuric acid being 20 cm. The thread is then allowed to pass for 120 cm. through the air and is wound on a bobbin revolving at a speed which produces a speed of spinning of about 18 m. per minute. Three glass rods are placed angularly to one another between the spinning bath and the bobbin over which rods the threads are conducted and are thus subjected to an additional stretching or tension. The lower part of the bobbin revolves in water, so that the sulphuric acid is removed or considerably diluted as soon as the thread arrives at the bobbin. The threads are then washed, purified, dried, twisted and finished in the usual manner.

The threads obtained consist of single filaments of about 2 to 2.5 deniers each. This 20 parts of α-dichlorhydrine used in this example corresponds to 20% based on the cellulose and about 1.3% based on the amount of the viscose.

(b) The same mode of operation as in (a), but with the variation that the temperature of the spinning bath is 0° C.

(c) The same mode of procedure as in (a), or (b), with the difference that the bath contains 70 per cent. of $H_2SO_4$.

(d) The same mode of operation as in (a), or (b), or (c), but with the difference that only 1.6 c. c. of the spinning solution is discharged per minute and that the nozzles have 100 perforations of 0.08 mm. diameter.

The titre of the single filaments is about 0.5 to 0.7 denier.

(e) Mode of operation as in (a), or (b), or (c), with the exception that 3 c. c. of the spinning solution are discharged per minute, that the nozzles have 100 apertures of 0.08 mm. diameter and that the speed of spinning is 30 m. per minute.

The titre of the single filaments is about 0.7 to 0.9 denier.

(f) The same mode of operation as in (a), or (b), or (c), but with the difference that 6.6 c. c. of the spinning solution are discharged per minute, that the nozzles have 100 perforations of 0.08 mm. diameter and that the speed of spinning is 40 m. per minute.

The titre of the single filaments is about 1 to 1.4 denier.

(g) The same mode of operation as in (a), but with the difference that 3 c. c. of the spinning solution are discharged per minute, that the nozzles have 24 perforations of 0.1 mm. diameter, that the setting bath contains 62 to 65 per cent. of $H_2SO_4$ and has a temperature of 0° C., and that the length of immersion of the thread in the setting bath is 80 cm.

The titre of the single filaments is about 4 to 5.5 denier.

(h) The process is conducted as in (f), but with the difference that the spinning solution is charged at a speed of about 14 c. c. per minute, that the speed of spinning is about 100 to 120 m. per minute, that the thread is not subjected to additional stretching and that the length of immersion is 80 to 100 cms.

(i) The same procedure as in (a) to (h), with the exception that the setting bath contains 40 per cent. of $H_2SO_4$.

II (a) to (i)

The process is conducted as in any one of the Examples I (a) to (i), but with the exception that, instead of 20 parts, 10 parts of α-dichlorohydrine are used (per 100 parts of cellulosic starting material).

III (a) to (i)

The process is conducted as in any one of the Examples I (a) to (i), but with the difference that, instead of 20 parts, 30 parts of α-dichlorohydrine are added to the viscose and that the thus obtained solution is allowed to age for about 48 hours at 15° C.

IV (a) to (i)

The mode of operation is the same as in any one of the Examples I (a) to (i), but with the difference that, after it has aged for 72 hours, such a quantity of caustic soda solution of 50 per cent. strength is added to the solution, as to cause the caustic soda content of the spinning solution to rise to 8 per cent.

V (a) to (l)

(a) The parent viscose is prepared as in Example I (a), but with the difference that, as starting cellulose, such wood-pulp or cotton linters are used as yield a viscose of pronounced high viscosity (particularly if the viscose contains a rather small amount of cellulose, such as below 5%) and that, for dissolving the xanthate such a quantity of caustic soda and water is used as to yield a solution containing about 3 per cent. of cellulose (determinable by analysis) and 5 per cent. of NaOH, the viscosity of the thus prepared viscose being about 1 to 2 as compared with glycerine of about 31° Bé. (1.26 specific gravity).

Immediately after the dissolution of the celluose xanthate, 20 parts of α-dichlorohydrine are added to the viscose, well stirred in, and the thus obtained solution allowed to age at 15° C. During ageing, the solution is filtered three times through cotton, and after it has attained a total age of 72 to 80 hours, it is spun as follows:—

The spinning solution is squirted at a speed of 3.7 c. c. per minute through a platinum nozzle (having 100 holes of 0.08 mm. diameter) into a bath containing 65 per cent. of $H_2SO_4$ and having a temperature of 16° C., the length of immersion of the threads in the sulphuric acid being 80 cm. Then the threads are allowed to pass through the air for 120 centimeters and wound on a bobbin revolving at such a speed as to produce a speed of spinning of about 18 m. per minute. In the air passage three glass rods are arranged angularly to one another, over which rods the thread runs, thus applying an additional stretch or tension to the thread. The lower part of the spool revolves in water, so that the sulphuric acid is removed or is considerably diluted as soon as the thread arrives at the spool. The threads are then washed, purified, twisted and finished in the usual manner.

The thread obtained in this manner consists of single filaments of about 0.6 to 0.8 deniers.

(b) The mode of operation is the same as in (a), but with the difference that the temperature of the coagulating bath is 4° C.

(c) Mode of procedure as in (a) or (b), but with the exception that the spinning bath contains 70 per cent. of $H_2SO_4$.

(d) Mode of procedure as in (a) or (b), but with the difference that the coagulating bath contains 60 per cent. of $H_2SO_4$.

(e) The same mode of operation as in (a), or (b), or (c), or (d), but with the difference that 6.8 c.c. of the spinning solution are discharged per minute and that the speed of spinning is 30 m. per minute.

The titre of the single filaments is about 0.6 to 0.8 denier.

(f) Mode of procedure as in (a), or (b), or (c), or (d), but with the difference that the spinning solution is discharged at a speed of 14.3 c.c. per minute, and that the speed of spinning is about 40 m. per minute.

The titre of the silk is about 1 to 1.3 denier per single filament.

(g) Mode of procedure as in (a), or (b), or (c), or (d), but with the difference that the spinning nozzles have 54 perforations of 0.1 mm. diameter, and that the spinning solution is discharged at a speed of 7.6 c.c. per minute.

The titre of the individual filaments is about 2 to 2.6 denier.

(h) Mode of procedure as in (g), but with the exception that the temperature of the setting bath is minus 5° C.

(i) Mode of procedure as in (a), or (b) or (c), or (d), but with the difference that the nozzles have 24 holes of 0.1 mm. diameter, and that the spinning solution is discharged at a speed of 6.8 c.c. per minute.

The titre of the single filaments is about 4 to 5 denier.

(k) Mode of procedure as in (i), but with the difference that the temperature of the setting bath is minus 5° C.

(l) The process is conducted as in (f), but with the difference that the spinning solution is discharged at a speed of about 30 c.c. per minute, that the speed of spinning is about 100 to 120 m. per minute, that the thread is not subjected to additional stretching, and that the length of immersion is 80 to 100 cms.

VI (a) to (l)

The process is conducted in the same manner as in any one of the Examples V (a) to (l), but with the difference that the spinning solution is allowed to age for 24 to 48 hours only this time being calculated from the beginning of the dissolving step. The strength of the sulphuric acid is, on the average, higher, say about 5 per cent. higher than in the Examples V (a) and (b) and (f) to (h).

VII (a) to (l)

The process is conducted in the same manner as in any one of the Examples V (a) to (l), or VI (a) to (l), but with the exception that, instead of 20 parts, 30 parts of α-dichlorohydrine are used.

VIII (a) to (l)

The process is conducted in the same manner as in any one of the Examples VII (a) to (l), but with the exception that, instead of 30 parts, 10 parts of α-dichlorohydrine are used.

IX (a) to (i)

(a) The spinning solution is prepared in the same manner as in Example II (a), but with the difference that the cellulose xanthate is dissolved in such a quantity of caustic soda and water that the solution contains about 6.5 per cent. of cellulose (determinable by analysis) and 8 per cent. of NaOH.

The spinning is performed as in any one of the Examples I (a) to (i).

X (a) to (i)

The mode of operation is the same as in any one of the Examples IX (a) to (i), but with the variation that, instead of the 10 parts of α-dichlorohydrine, 20 parts of α-dichlorohydrine are used.

The concentrations of the spinning acids were varied as follows:

Spinning method (a) and (b) 61 to 65 per cent. of $H_2SO_4$.

Spinning method (d) 55 to 65 per cent. of $H_2SO_4$.

Spinning method (e) 60 to 64 per cent. of $H_2SO_4$.

Spinning method (f) 55 to 65 per cent. of $H_2SO_4$.

Spinning method (g) and (h) 58 to 65 per cent. of $H_2SO_4$.

XI (a) to (i)

The mode of operation is the same as in any one of Examples IX (a) to (i), but with the difference that instead of 10 parts, 30 parts of α-dichlorohydrine are used.

The concentrations of the spinning acids were varied as follows:

Spinning method (a) and (b) 60 to 65 per cent. of $H_2SO_4$.

Spinning method (d) 55 to 60 per cent. of $H_2SO_4$.

Spinning method (e) and (f) 55 to 62 per cent. of $H_2SO_4$.

Spinning method (g) and (h) 55 to 60 per cent. of $H_2SO_4$.

Spinning method (i) 40 per cent. of $H_2SO_4$.

XII (a) to (i)

The mode of operation is the same as in any one of the Examples I (a) to (i) or XI (a) to (i), but with the difference that, before being spun, the spinning solution is allowed to age for 48 hours at 15° C. Higher strengths of the spinning acids may be employed in the Examples (a) to (h), for example 68 to 71 per cent. of $H_2SO_4$.

XIII (a) to (i)

The mode of operation is the same as in any one of the Examples IX (a) to (i), but with the difference that, instead of 10 parts, 40 parts of α-dichlorohydrine are used, and that the spinning solution is allowed to age for 48 hours only.

The concentrations of the spinning acids were varied as follows:

Spinning method (a) and (b) 58 to 64 per cent. of $H_2SO_4$.

Spinning method (d) 52 to 60 per cent. of $H_2SO_4$.

Spinning method (e) 55 to 60 per cent of $H_2SO_4$.

Spinning method (f) 58 to 62 per cent. of $H_2SO_4$.

Spinning method (g) and (h) 55 to 60 per cent. of $H_2SO_4$.

Spinning method (i) 40 per cent. of $H_2SO_4$.

XIV (a) to (b) and (f) to (i)

The process is conducted in the same manner as in any one of Examples IV (a) to (b) and (d) to (i), but with the difference that, instead of 20 parts of α-dichlorohydrine, 10 parts of α-dichlorohydrine are used and that the cellulose xanthate is dissolved in water to make a solution containing about 6.5 per cent. of cellulose and 3.2 per cent. of NaOH. During the ageing of the viscose treated with the dichlorohydrine jellification occurs.

After 72 hours caustic soda solution of 50 per cent. is added to increase the caustic soda content to 8 per cent.

XV (a) to (b) and (d) to (i)

The mode of operation is the same as in any one of the Examples XIV (a) to (b) and (d) to (i), but with the difference that, instead of 10 parts, 20 parts of α-dichlorohydrine are added to the viscose.

The concentrations of the spinning acids where varied are as follows:

Spinning method (a) and (b) 57 to 62 per cent. of $H_2SO_4$.

Spinning method (d) 56 to 60 per cent. of $H_2SO_4$.

Spinning method (e) 55 to 60 per cent. of $H_2SO_4$.

Spinning method (f) 58 to 62 per cent. of $H_2SO_4$.

Spinning method (g) and (h) 55 to 58 per cent. of $H_2SO_4$.

Spinning method (i) 40 per cent of $H_2SO_4$.

XVI (a) to (i)

The process is conducted as in any one of the Examples X (a) to (i), but with difference that, instead of 20 parts of α-dichlorohydrine, 25 parts of α-dibromohydrine are used.

XVII (a) to (i)

The process is conducted as in any one of the Examples X (a) to (i), but with the difference that, instead of 20 parts of α-dichlorohydrine, 28 parts of mannite dichlorohydrine are used, which before being added to the viscose, are dissolved in the caustic soda solution intended for dissolving the cellulose xanthate.

XVIII (a) to (b) and (d) to (i)

The process is conducted as in any one of the Examples I (a) to (b) and (d) to (i), but with the difference that, instead of 20 parts of α-dichlorohydrine, 15 parts of ethylene chlorohydrine are used.

The concentrations of the spinning acids where varied are as follows:

Spinning method (a) and (b) 60 to 62 per cent. of $H_2SO_4$.

Spinning method (d) to (h) 58 to 60 per cent. of $H_2SO_4$.

Spinning method (i) 40 per cent. of $H_2SO_4$.

XIX (a) to (b) and (d) to (i)

The process is conducted as in any one of the Examples XVIII (a) to (b) and (d) to (i), but with difference that, instead of 15 parts, 20 parts of ethylene chlorohydrine are added to the viscose.

The strengths of the spinning acids used in the spinning methods (a) to (b) and (d) to (h) are 53 to 57 per cent. of $H_2SO_4$.

XX (a) to (i)

The process is conducted as in any one of the Examples I (a) to (i), but with the difference that, instead of 20 parts of α-dichlorohydrine, 20 parts of ethylene chlorohydrine are added to the viscose, the so obtained spinning solution being aged for 48 hours at 15° C.

XXI (a) to (i)

The process is conducted in the same manner as in any one of the Examples IV (a) to (i), but with the exception that, instead of 20 parts of α-dichlorohydrine, 15 to 20 parts of ethylene chlorohydrine are used.

XXII (a) to (b) and (d) to (i)

The process is conducted in the same manner as in any one of the Examples X (a) to (b) and (d) to (i), but with the difference that, instead of the α-dichlorohydrine 20 parts of ethylene chlorohydrine are used.

The concentrations of the spinning acids were varied as follows:

Spinning method (a) and (b) 60 to 62 per cent. of $H_2SO_4$.

Spinning method (d) 55 to 60 per cent. of $H_2SO_4$.

Spinning method (e) 58 to 60 per cent. of $H_2SO_4$.

Spinning method (f) 55 to 58 per cent. of $H_2SO_4$.

Spinning method (g) and (h) 55 to 58 per cent. of $H_2SO_4$.

Spinning method (i) 40 per cent of $H_2SO_4$.

XXIII (a) to (i)

The process is conducted as in any one of the Examples XI (a) to (i), but with the exception that, instead of 20 parts of α-dichlorohydrine, 30 parts of ethylene chlorohydrine are employed.

XXIV (a) to (b) and (d) to (i)

The process is conducted as in any one of the Examples XVIII (a) to (b) and (d) to (i), but with the difference that, instead of ethylene chlorohydrine, 15 parts of glycerine-α-monochlorohydrine are used.

The concentrations of the spinning acids were as follows:

Spinning method (a) and (b) 60 to 65 per cent. of $H_2SO_4$.

Spinning method (d) 55 to 58 per cent. of H₂SO₄.

Spinning method (e) 56 to 60 per cent. of H₂SO₄.

Spinning method (f) 57 to 60 per cent. of H₂SO₄.

Spinning method (g) and (h) 57 to 62 per cent. of H₂SO₄.

Spinning method (i) 40 per cent. of H₂SO₄.

XXV (a) to (i)

The process is conducted as in any one of the Examples IV (a) to (i), but with the difference that, instead of 20 parts of α-dichlorohydrine, 15 to 20 parts of glycerine-α-monochlorohydrine are employed.

XXVI (a) to (i)

The mode of operation is as in any one of the Examples X (a) to (i), but with the difference that, instead of 20 parts of α-dichlorohydrine, 15 to 20 parts of glycerine-α-monochlorohydrine are used.

XXVII (a) to (i)

The process is conducted as in any one of the Examples XI (a) to (i), but with the difference that, instead of α-dichlorohydrine, 30 parts of glycerine-α-monochlorohydrine are used.

XXVIII (a) to (i)

The process is conducted as in any one of the Examples II (a) to (i), but with the difference that, instead of α-dichlorohydrine, 10 parts of epichlorohydrine are used.

XXIX (a) to (b) and (f) to (i)

The process is conducted as in any one of the Examples XVIII (a) to (b) and (f) to (i), but with the difference that, instead of the 15 parts of ethylene chlorohydrine, 20 parts of epichlorohydrine are used.

XXX (a) to (i)

The mode of operation is the same as in any one of the Examples X (a) to (i), but with the difference that, instead of α-dichlorohydrine, 20 parts of epichlorohydrine are used.

XXXI (a) to (b) and (f) to (i)

The mode of operation is the same as in any one of the Examples XXIX (a) to (b) and (f) to (i), but with the difference that instead of 20 parts, 30 parts of epichlorohydrine are used.

XXXII (a) to (i)

The mode of operation is the same as in any one of the Examples IX (a) to (i), but with the difference that the spinning solution is allowed to age for 120 hours at a temperature of 15° C.

XXXIII (a) to (i)

The process is conducted as in any one of the Examples IX (a) to (i), but with the exception that, instead of α-dichlorohydrine, 10 parts of propylene chlorohydrine are used.

XXXIV (a) to (i)

The process is conducted as in any one of the Examples XXXIII (a) to (i), but with the difference that, instead of 10 parts, 20 parts of propylene chlorohydrine are employed.

XXXV (a) to (i)

The process is conducted as in any one of the Examples IX (a) to (i), but with the exception that, instead of 10 parts of α-dichlorohydrine, 15 parts of trimethyleneglycol chlorohydrine are used.

XXXVI (a) to (i)

The process is conducted as in any one of the Examples I (a) to (i), but with the difference that instead of α-dichlorohydrine, 20 parts of trichlorohydrine are employed, the strengths of the acids used in (a) to (h) being 65 to 70 per cent. of H₂SO₄.

XXXVII

The process is conducted in the manner described in any of the foregoing examples, but with the difference that the alkali cellulose, before it is brought together with the carbon-bisulphide, is allowed to ripen at a temperature of 15° C. for 48 hours.

XXXVIII

The process is conducted as in Example XII, but with the difference that 7 c. c. of the spinning solution per minute is pressed through a platinum nozzle, having 100 perforations of 0.08 mm. diameter that the speed of spinning is 60 m. per minute, that sulphuric acid of 78 per cent. strength at a temperature of 8° C. is used as a spinning bath, that the length of immersion is 20 cm., and the length of passage through the air is 40 cm.

The spinning may also be conducted in sulphuric acid of 82 per cent. of H₂SO₄.

XXXIX (a) to (i)

The mode of operation is the same as in any one of the foregoing examples, but with the difference that the spinning bath contains 10 per cent. of ammonium sulphate in addition to the strong sulphuric acid.

XL (a) to (i)

The mode of operation is the same as in any one of the foregoing examples, but with the difference that the spinning bath contains 5 to 7½ per cent. of glucose in addition to the strong sulphuric acid.

The foregoing examples may also be modified by using hydrochloric acid of 40 to 42 per cent. strength as the spinning bath.

XLI

One of the spinning solutions produced according to one of the foregoing prescriptions is spun in the known manner in any one of the following baths:—

(1) In a solution of ammonium sulphate of 25 to 30 per cent. strength, (2) In a bath consisting of 500 parts of sodium bisulphate, 76 parts of sulphuric acid of 66° Bé. and 587 parts of water, which bath may be kept at room temperature or at a raised temperature, for instance 50° C., or (3) In a bath consisting of 982 parts of water, 180 parts of sodium sulphate, 60 parts of ammonium sulphate, 15 parts of zinc sulphate, 135 parts of glucose and 128 parts of sulphuric acid of 66° Bé.

The coagulated thread is introduced from one of the baths here cited into a bath of the following composition:—

(1) Sulphuric acid of 70 per cent. of H₂SO₄ or (2) Sulphuric acid of 60 to 65 per cent. of H₂SO₄ or (3) Sulphuric acid of 55 per cent. of H₂SO₄ or (4) A solution of 13.3 parts of ammonium sulphate in 120 parts by weight of sulphuric acid of 62 to 70 percent. of $H_2SO_4$, to which 9 to 10 parts of sulphuric acid of 66° Bé. are added.

(5) Hydrochloric acid of 40% strength.

The temperature of the second bath may be kept below room temperature, for instance at 0 to 10° C., or at room temperature, or even above room temperature, for instance at 25° to 45° C.

The length of immersion of the thread in the second bath may be small, for instance 20 cm. or also large, for instance 30 to 120 cm or more.

The threads are stretched by any one of the known methods, either in the second bath or after they have left it. This may be arranged by making the distance of the collecting device from the second setting bath very large, or by conducting the threads over one or several rods, hooks, rollers, or differential rollers, which are arranged between the nozzle and the collecting device in the second bath or outside it or at both places.

The threads are collected, while the sulphuric acid is removed or diluted by washing as has previously been described, and the threads are finally washed completely, dried and treated in the manner described in Example I.

According to the foregoing examples lustrous artificial silk is obtained having a dry tenacity of more than 2 grams per denier, in many cases more than 4 or even 5 and in some cases even 6 grams per denier, a wet tenacity of about 1 to 1.5 grams per denier, in many cases 3 to 4 grams and in some cases even more than 4 grams per denier, and, in spite of this, an extensibility of at least about 7 per cent. and in some cases of up to 15 per cent. or even more.

In the foregoing examples, in order to obtain the additional stretching, differential rollers of equal or varying speeds may also be used.

In all the foregoing examples the action of the acid may be interrupted also by subjecting the threads leaving the bath consisting of, or containing, strong acids, to a low temperature, for instance —5 to —15° C. before they are washed, which low temperature treatment, for instance may be done by collecting it on a hollow spool containing a cooling agent, for instance solid carbonic acid, or a freezing mixture, or ice.

Details for the manufacture of staple fibre will readily be understood from the foregoing examples.

When the threads have been washed, they may be heated or steamed at high temperatures (for instance 100° to 110° C.) before or after the drying process.

Any desulphurization or bleaching of the threads may be conducted in the known manner.

XLII

A spinning solution, produced in the manner described in any one of the foregoing examples is introduced in the known manner into one of the coagulating and plasticizing liquids named in the foregoing examples through a suitable hopper or slit, and the coagulated film band, after having been run through this bath, is washed in the known manner and dried.

XLIII

A cotton fabric is impregnated or filled, or coated, one or several times, on a suitable machine, for instance a padding machine, or a back-filling machine, or a spreading machine, with a solution like a spinning solution produced in the manner described in one of the foregoing examples, to which solution a filling material such as talc or china clay (for instance 100 to 200 per cent. calculated on the weight of the cellulose in said solution) or a dyestuff or a pigment, such as mica, or lampblack, may be added and without being dried, if necessary in a state of tension, is passed through a bath having the composition of one of the plasticizing baths mentioned in the foregoing examples. The dressed or coated fabric is then washed and dried.

XLIV

Mode of procedure exactly as in Example XLIII, but with the difference that, before being introduced into the coagulating bath, the impregnated fabric is dried at 40 to 60° C.

General remarks

Where in the foregoing examples α-dichlorohydrine is used, the β-dichlorohydrine may be used instead.

In the foregoing examples, instead of the chlorine derivatives the equivalent quantities of bromine- or iodine derivatives may be used.

In the foregoing examples, instead of the halogen derivatives used, equivalent quantities of other halogen derivatives may be used, for instance pinacone chlorohydrine (tetramethylethylene chlorohydrine), mannite chlorohydrine, erythrite chlorohydrine, erythrite dichlorohydrine, pentaerythrite chlorohydrine, pentaerythrite dichlorohydrine, mannitane dichlorohydrine, dulcitan monochlorohydrine, divinylethyleneglycol chlorohydrine, phenylpropanol-chlorohydrine, naphthylpropanol chlorohydrine, 4-methoxynaphthylpropanol chlorohydrine and the like.

The foregoing examples may also be modified by using hydrochloric acid of 36 to 42 per cent. strength as the spinning bath.

Instead of the strong sulphuric acid or hydrochloric acid there may also be used strong nitric acid, for instance with a content of 60 to 90 per cent. of $HNO_3$, or strong phosphoric acid, for instance of 1.5 to 1.86 specific gravity (67.5 to 99% of $H_3PO_4$), or strong arsenic acid, for instance with a content of 60 to 90 per cent. of $H_3AsO_4$, or a strong zinc chloride solution of about 60 per cent. strength containing about 4 to 6 per cent. of hydrochloric acid; in short any agent that has a plasticizing effect on the freshly coagulated artificial material, for example thread.

In the foregoing examples, in the preparation of the viscose, instead of sulphite cellulose or linters there may be used cotton or wood-pulp which has been pre-treated cold or hot with a dilute acid, for instance hydrochloric acid or sulphuric acid, in short any kind of cellulose material may be used which is used or has been proposed in the viscose art.

The foregoing examples may also be modified, in that the alkali cellulose, before being treated with carbon bisulphide, is allowed to ripen for a shorter period than stated in Example XXXVII (48 hours) for instance 24 or 36 hours, or longer, for instance 60 to 72 hours, and at a temperature of 15 to 20° C.

As stated above, irrespective of the origin of the cellulose used, the alkali cellulose may be matured or not, as desired in any particular case.

As a guiding line with regard to the question whether or not (in a particular case) the alkali cellulose should be allowed to mature before being brought together with the carbon bisulphide may, among others, serve the desired viscosity of the solution which is to be worked up into artificial material in general and artificial threads in particular, and in connection therewith the viscosity of the kind of cellulose contemplated. If it is desired to give the solution a definite viscosity, then the alkali cellulose produced from the kind of cellulose contemplated is subjected to a maturing process, if without maturing this kind of cellulose yields a higher viscosity. If, however, it exhibits from the first the desired grade of viscosity, that is without maturing, then the maturing would be superfluous and hence would be omitted. Now, as the viscosities of the different kinds of cellulose on the market (linters and wood-pulp) differ very much from one another, the question of maturing depends in most cases on the one hand on the viscosity desired of the initial solution intended for the manufacture of artificial material, and on the other hand on the viscosity of the kind of cellulose being worked.

Although, according to general practice, the term "oxy" covers also "hydroxy", to avoid any misunderstanding, it is pointed out that in the specification and claims the term "oxy" is intended to cover "hydroxy" also.

The expression "a halogen derivative of a polyhydroxylic alcohol" includes (wherever the context permits), the halogen derivatives of polyhydroxylic alcohols (whether such derivatives contain a hydroxyl group or not) as well as the halogen derivatives of the anhydrides, esters and ethers of such alcohols.

In this specification and appended claims, I use the term "polyhydroxylic alcohol" to include both alcohols containing two OH groups and those containing more than two OH groups.

The term "alkyl" or "oxyalkyl" or "hydroxyalkyl" is intended to include the halogenated or nonhalogenated radicals of polyhydroxylic alcohols by themselves or in conjunction with one or more oxygens or hydroxyls.

Consequently, the term "radicals of polyhydroxylic alcohols" is intended to include the halogenated or non-halogenated radicals of polyhydroxylic (i. e. di- or polyvalent) alcohols by themselves or in conjunction with one or more oxygens or hydroxyls.

The expression "viscose or cellulose xanthate" wherever the context permits includes cellulose xanthates or their solutions or their derivatives or solutions of cellulose xanthate derivatives.

The expression "artificial material" used in the specification and claims includes: Artificial threads, particularly artificial silk; films; coatings and layers of every kind; dressings for textiles; paper, leather and the like; sizing for yarns; book cloth; artificial leather; plates and shaped or partly shaped plastic compositions in general; and the like.

The term "artificial threads" denotes artificial threads and spun goods of all kinds, for instance artificial silk, staple fibre, artificial cotton, artificial wood, artificial hair, and artificial straw of any kind.

The expression "strong mineral acids" denotes sulphuric acid of at least 35 per cent. of $H_2SO_4$, preferably at least 45 per cent. of $H_2SO_4$, and as regards the other mineral acids, solutions of equivalent strength.

The expression "strong sulphuric acid" or "sulphuric acid containing at least about 35 per cent. of sulphuric acid monohydrate" denotes sulphuric acid having a content of 35 to 98 per cent. of $H_2SO_4$.

What I claim is:—

1. A process of making artificial materials which comprises acting upon viscose with a halogen derivative of a polyhydroxylic alcohol, and thereafter forming the thus obtained product into the shape of an artificial material, and acting upon the latter with an agent having a coagulating effect upon the shaped solution, and a plasticizing effect on the coagulated material.

2. A process of making artificial materials which comprises acting upon viscose with a halogen derivative of a polyhydroxylic alcohol and acting upon the product in the shape of an artificial material, with a medium containing a mineral acid equivalent to sulphuric acid of at least 35% strength.

3. A process which comprises acting upon viscose with a halogen derivative of a polyhydroxylic alcohol, producing a coagulated artificial material from the reaction product, and treating such artificial material with an acid plasticizing agent.

4. A process which comprises acting upon viscose with a halogen derivative of a polyhydroxylic alcohol, producing an artificial material from the reaction product, and treating such artificial material with an acid of a strength equivalent to sulphuric acid of at least about 35% strength.

5. A process which comprises acting upon viscose with a halogen derivative of a polyhydroxylic alcohol, and shaping the thus obtained product, coagulating the same while shaped, and plasticizing the coagulated product.

6. A process of making artificial materials which comprises acting upon viscose with a halogen derivative of a polyhydroxylic alcohol and acting upon the product in the shape of an artificial material, with a medium containing at least 35% of sulphuric acid monohydrate.

7. A process as in claim 1 in which the artificial material is subjected to a stretching during a part of the process after the commencement of the coagulation, such stretching being in addition to the stretching incidental to the normal formation of the artificial material.

8. Process as in claim 1, in which the halogen derivative used is a halohydrine.

9. In the process of claim 2, the step of checking the action of the mineral acid when the action thereof has progressed sufficiently, and before substantial injury to the artificial material.

10. A process of making artificial materials which comprises acting upon viscose with a halogen derivative of a polyhydroxylic alcohol, and thereafter causing a pre-shaped stream of the thus obtained product to enter a bath having a coagulating effect upon such pre-shaped stream of solution, and a plasticizing effect on the coagulated material.

11. In the process of claim 10, the step of applying a stretching tension at any stage between the step of introducing the solution into said bath and the final collecting device.

12. In the process of claim 10, the step of applying stretching during the treatment with the plasticizing agent.

13. In the process of claim 10, the step of stretching the artificial material at any time after applying the plasticizing agent and before the final removal of the plasticizing agent from said artificial material.

14. A process of making artificial materials which comprises acting upon viscose with a halogen derivative of a polyhydroxylic alcohol, and thereafter causing the thus obtained product to enter as a thread-like stream into a bath containing a coagulating agent for such product to form a coagulated artificial material, and treating the said artificial material with an agent having a plasticizing effect on the coagulated material.

15. A process of making artificial materials which comprises acting upon viscose with a halogen derivative of a polyhydroxylic alcohol, and thereafter preshaping a stream of the thus obtained product and causing such stream to enter a bath containing an agent capable of coagulating the same in the form of an artificial material; and then treating the latter with a plasticizing agent therefor.

16. The process of claim 15 in which the plasticizing agent is sulphuric acid of at least 35% strength.

17. The process of claim 15 in which the plasticizing agent is a mineral acid of a strength corresponding to sulphuric acid of at least 35% strength.

18. A process of making artificial materials which comprises acting upon a solution of a xanthated cellulosic compound with a halogen derivative of a polyhydroxylic alcohol and acting upon the product in the shape of an artificial material, with a mineral acid of a strength equivalent to sulphuric acid of at least 35% strength.

19. A process of making artificial materials which comprises acting upon viscose with a halogen derivative of a polyhydroxylic alcohol and acting upon the product in the shape of an artificial material with sulphuric acid of at least 35% strength.

20. A process which comprises acting upon viscose with a halohydrin of glycerin, producing an artificial material from the reaction product, and treating such artificial material with a plasticizing agent.

21. A process which comprises acting upon viscose with a halohydrin of a glycol, producing an artificial material from the reaction product, and treating such artificial material with a plasticizing agent.

22. A process which comprises acting upon viscose with a halogen derivative of a polyhydroxylic alcohol and producing an artificial material from the reaction product by introducing the latter, in a shaped condition into an acid coagulating bath which has a plasticizing effect on the artificial material.

23. A process which comprises reacting upon viscose with a halogen derivative of a polyhydroxylic alcohol and producing an artificial material from the reaction product by continuously introducing a shaped stream of the same into a coagulating bath which has a plasticizing effect on the artificial material.

24. A process which comprises reacting upon viscose with a halogen derivative of a polyhydroxylic alcohol and introducing fine streams of such reaction product, in a liquid state, into a setting agent, to form a filament-like structure, which setting agent has a plasticizing effect on the filament-like structure.

25. A modification of the process as covered in claim 24, in which the plasticized filament-like structure is not subjected to any additional stretch, after the same enters the plasticizing bath.

26. A process which comprises reacting with a halogen derivative of a polyhydroxylic alcohol, upon a cellulosic compound containing a CSS-group, shaping the reaction product into the form of an artificial material and subjecting such product to the action of an agent capable of coagulating the solution and plasticizing the artificial material.

27. A process which comprises reacting with a haloid ester of a polyhydroxylic alcohol, upon a cellulosic compound containing a CSS-group, shaping the resulting reaction product into the form of an artificial material and subjecting such product to the action of an acid medium which has a plasticizing effect on the freshly coagulated artificial material.

28. A process as in claim 1, in which the artificial material is subjected to a stretching during a part of the process after the commencement of the plasticizing treatment.

29. Process as in claim 1, in which the halogen derivative used is a chlorhydrine.

30. In the manufacture of strong artificial silk the herein described improvement which comprises incorporating a halogen derivative of a polyhydroxylic alcohol into the viscose, and thereafter to squirting same, and subjecting the filaments to a coagulating and plasticizing treatment.

31. A process in which the artificial silk, after being produced by the process as covered in claim 30, is washed and thereafter subjected to steam temperature, whereby its tenacity is further increased.

32. A process which comprises acting upon viscose with a halogen derivative of a polyhydroxylic alcohol and producing an artificial material from the reaction product by introducing the latter, in a shaped condition first into a bath which has a coagulating effect on the shaped material and then into a bath which has a plasticizing effect on the freshly coagulated material.

33. A process which comprises acting upon viscose with a halogen derivative of a polyhydroxylic alcohol and producing an artificial material from the reaction product by continuously introducing a shaped stream of the same first into a bath which has a coagulating effect on the shaped stream, and then into a bath which has a plasticizing effect on the freshly coagulated shaped stream.

34. A process which comprises acting upon viscose with a halogen derivative of a polyhydroxylic alcohol, and introducing fine streams of such reaction product, in a liquid state, into a setting agent, to form a filament-like structure, and then treating such structure with a plasticizing agent.

35. A process which comprises acting with a halogen derivative of a polyhydroxylic alcohol, upon a cellulosic compound containing a CSS-group, shaping the reaction product into the form of an artificial material and subjecting such product to the action of an agent capable of coagulating the artificial material and then to the action of an agent capable of plasticizing the freshly coagulated artificial material.

36. A process which comprises acting with a halogen derivative of a polyhydroxylic alcohol, upon a cellulosic compound containing a CSS-group, shaping the resulting reaction product into the form of an artificial material and subjecting such product to the action of a medium which has a coagulating effect on the reaction product and then to the action of an acid medium which has a plasticizing effect on the freshly coagulated artificial material.

37. In the manufacture of artificial materials from a cellulose derivative containing a CSS-group, the steps of acting on said cellulose derivative with a halogen derivative of a polyhydroxylic alcohol, giving the so-treated cellulose derivative the form of an artificial material, and subjecting the latter to action of a mineral acid having plasticizing action on the artificial material.

38. In the manufacture of artificial materials from a soluble cellulose derivative containing a CSS-group, the steps of acting with a halohydrine upon the said cellulose derivative, while the latter is in a dissolved state, giving the solution of the so converted cellulose derivative the form of an artificial material, and subjecting the latter to action of a mineral acid having plasticizing action on the artificial material.

39. As new products, shaped artificial materials having a tenacity in excess of 2 grams per denier and which have an extensibility not substantially below 7 per cent and which after repeated extraction successively with hot alcohol, hot ether and hot pyridine, will yield on being treated according to Zeisel's method a determinable amount of alkyl iodide.

40. As new products, shaped artificial materials having a tenacity in excess of 2 grams per denier and which have an extensibility not substantially below 7 per cent, and which, after repeated extraction successively with hot alcohol, hot ether and hot pyridine, will yield on being treated according to Zeisel's method, a determinable amount of $C_3H_7I$.

41. Artificial threads having a dry tenacity of over 2 grams per denier and an extensibility of at least 7 per cent which, after repeated extraction successively with hot alcohol, hot ether and hot pyridine, will yield on being treated according to Zeisel's method, a determinable amount of alkyl iodide, such products being made by coagulating and plasticizing a thread-like stream of a reaction product of viscose with a halogen derivative of a polyhydroxylic alcohol.

42. Artificial threads having a dry tenacity of over 2 grams per denier and an extensibility of at least 7 per cent which, after repeated extraction successively with hot alcohol, hot ether and hot pyridine, will yield on being treated according to Zeisel's method, a determinable amount of $C_3H_7I$, such products being made by coagulating and plasticizing a thread-like stream of a reaction product of viscose with a halogen derivative of a polyhydroxylic alcohol.

43. Artificial threads having a dry tenacity exceeding 2 grams per denier and containing an oxyalkyl derivative of cellulose, such products being made by coagulating and plasticizing a thread-like stream of a reaction product of viscose with a halogen derivative of a polyhydroxylic alcohol.

44. As new products, artificial threads containing an oxyalkyl derivative of cellulose and having a tenacity of substantially over 2 grams per denier, and an extensibility of substantially over 7%, such products being made by coagulating and plasticizing a thread-like stream of a reaction product of viscose with a halogen derivative of a polyhydroxylic alcohol.

LEON LILIENFELD.